United States Patent [19]
Vincent et al.

[11] 3,932,060
[45] Jan. 13, 1976

[54] BIFILAR VIBRATION DAMPERS

[75] Inventors: Alan Henry Vincent; Ronald William Lewis Cure, Yeovil, both of England

[73] Assignee: Westland Aircraft Limited, Yeovil, England

[22] Filed: Sept. 20, 1974

[21] Appl. No.: 507,933

[30] Foreign Application Priority Data
Oct. 9, 1973  United Kingdom............... 47164/73

[52] U.S. Cl. .................. 416/145; 416/500; 74/574
[51] Int. Cl.² ........................................ B64C 27/32
[58] Field of Search.................... 416/144, 145, 500; 74/572–574

[56] References Cited
UNITED STATES PATENTS

| | | | |
|---|---|---|---|
| 3,540,809 | 11/1970 | Paul et al. ........................ | 416/144 X |
| 3,874,818 | 4/1975 | Saunders et al. ................ | 416/500 X |

*Primary Examiner*—Everette A. Powell, Jr.
*Attorney, Agent, or Firm*—Larson, Taylor & Hinds

[57] ABSTRACT

This invention relates to improvements in bifilar vibration dampers, and particularly to such dampers for use in absorbing vibrations in a helicopter main rotor system.

The improved bifilar construction prevents detrimental inertia forces affecting the tuning of the damper and also prevents the ingress of dirt and dust into the moving parts.

8 Claims, 7 Drawing Figures

BIFILAR VIBRATION DAMPERS

This invention relates to bifilar vibration dampers, and particularly to such dampers adapted for cancelling vibrations in a helicopter main rotor system.

By a bifilar vibration damper we mean a damper having a mass which is connected to a support by two pins so that, during operation, the mass moves in a pendulous movement with respect to the support. When the pendulum natural frequency is equal to an external exciting frequency the pendulum exerts a force on the support which is equal and opposite to the force applied by the external excitation, so that vibration is either reduced or eliminated.

One of the parts, usually the mass in existing designs, is of U-shaped cross-section, and is arranged to receive the other part, that is the support, between its parallel side portions. The pendulous movements of the mass are permitted by rolling of the two pins along the surfaces of circular apertures through both of the arms of the U-shaped mass and through the support. Two large diameter washers are clamped on each pin and located between the inner surfaces of the side portions of the U-shaped mass and the adjacent surfaces of the support to retain the pins in their operative positions.

When adapted for use in a helicopter rotor system, at least three bifilar vibration dampers are arranged symmetrically about the rotational axis of the main rotor system at the ends of supports in the form of arms extending radially from a rotor hub. The dampers rotate with the rotor system in a plane perpendicular to the axis of rotation, and can be located either above, below, or coincident with the plane of rotation of the main rotor blades.

According to the invention we provide a bifilar vibration damper having a mass connected by two pins to a support so that the mass is capable of pendulous movement relative the support, either the mass or the support being of U-shaped cross-section arranged to receive the other part between its parallel side portions, the side portions being spaced to define a spacing distance between each side portion and an adjacent surface of the other part, each pin being located in apertures through the side portions of the U-shaped part and through the other part, the two apertures through both parts having a radiussed section concentric about parallel axes, wherein the two pins are located through holes in a spacer member positioned in each spacing distance, the holes being arranged to permit rotation of the pins, an end plate being secured on an outer surface of each side portion of the U-shaped part over the apertures in which the pins are located.

According to another aspect of the invention we provide a helicopter having a main rotor system including a plurality of rotor blades arranged for rotation about an axis of rotation, and at least three bifilar vibration dampers each including a support member arranged to extend radially from and to be rotated in a plane about the axis of rotation and having two generally semi-circular apertures extending therethrough, each having a radiussed section concentric about parallel axes which are parallel to and equidistant from the axis of rotation, the apertures being located with their radiussed surfaces furthest from the axis of rotation, a pendulous member of U-shaped cross-section having substantially parallel side portions arranged to be positioned on opposite sides of the support member and spaced so as to define a spacing distance from said support member, each side portion having two semi-circular apertures extending therethrough, each having a radiussed section concentric about parallel axes which are parallel to the axis of rotation and being of substantially similar dimension as the support member apertures, the apertures in each side portion being aligned respectively with the apertures of the other side portion and located with their radiussed surfaces closest to the axis of rotation, a pin member extending through each of the apertures of the support member and the aligned apertures of the side portions to connect the pendulous member to the support member, the pin member being of substantially circular cross-section and having a radius less than the radius of the radiussed section of the apertures, a spacer member positioned between the support member and each of the side portions and having two holes to permit rolling of the pin members and an external shape arranged so that a periphery of the spacer member overlaps the apertures in the support member and the side portions with the pendulous member in any of its extreme operational positions relative the support, and an end plate secured on an outer surface of each side plate portion over the apertures to retain the pin members in an operative position.

The invention will now be described by way of example only and with reference to the accompanying drawings, in which.

Figure 1:
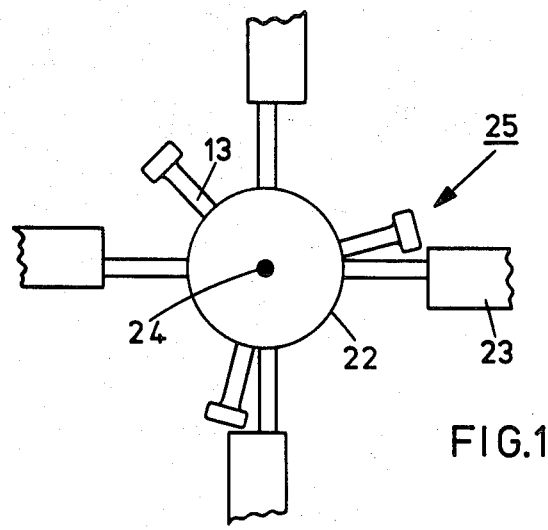
FIG. 1 is a plan view of a helicopter main rotor system.

In FIG. 1, a helicopter main rotor system includes a rotor hub 22 and four radially extending rotor blades 23 arranged for rotation with the hub 22 about a generally vertical axis 24. Three bifilar vibration dampers 25 are arranged symmetrically on the hub 22 at the ends of arms 13 extending radially from the hub 22 for rotation therewith about the axis of rotation 24, and are tuned to absorb vibrations in the plane of rotation of the rotor system.

Figure 2:
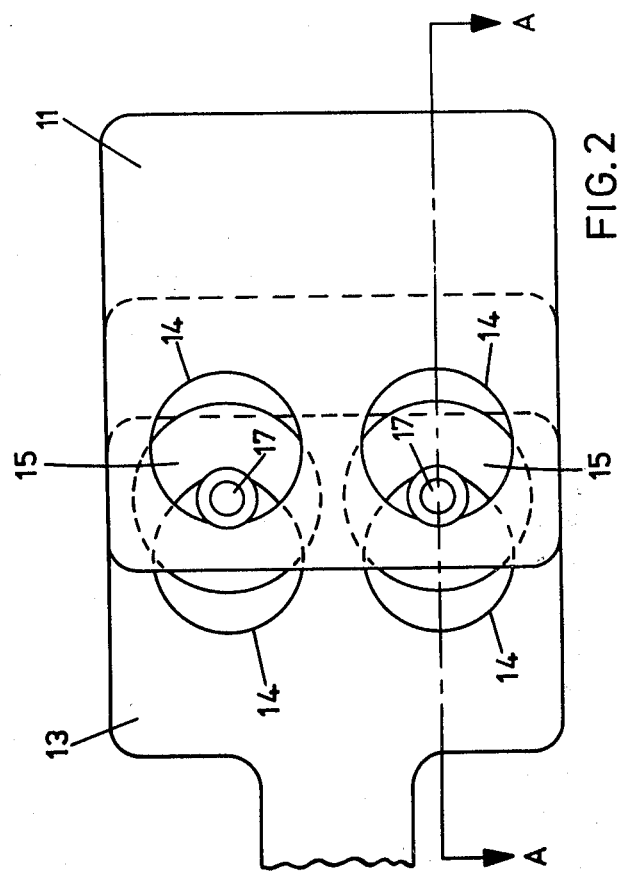
FIG. 2 is a plan view of an existing bifilar damper construction.
Figure 3:
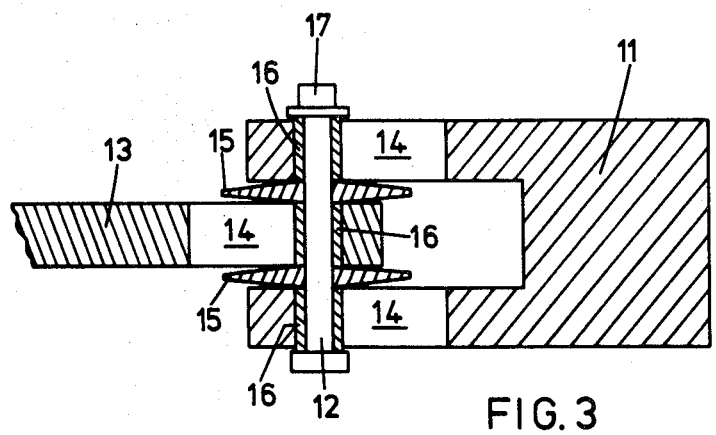
FIG. 3 is a sectioned view on lines A—A of FIG. 2.

Referring now to FIGS. 2 and 3, an existing bifilar damper construction comprises a mass in the form of a U-shaped weight 11 connected by two pins 12 at an end of a supporting arm 13. The pins 12 are located in circular apertures 14 in both of the parallel arms of the weight 11 and in the support 13, to permit pendulous movement of the weight 11 relative the support 13 by rolling of the pins 12 over the surfaces of the apertures 14.

The pins 12 are retained by cylindrical washers 15 located between the parallel side portions of the weight 11 and the support 13, the washers 15 being clamped between annular spacer members 16 retained by nuts 17 (FIG. 3). The spacer members 16, therefore, form the contact surface during rolling movements of the pins 12 around the surfaces of the apertures 14.

It will be apparent in relation to the existing bifilar dampers shown in FIGS. 2 and 3 that the outside diameter of the washers 15 must always be greater than the diameter of the apertures 14 in order to retain the pins 12 in their correct operative position. As the washers 15 are clamped on the pins 12, any rolling of the pins 12 will cause rotation of the washers 15, resulting in the washers 15 having a relatively large inertia which is detrimental to the operational efficiency of existing bifilar dampers, as is more fully explained hereinafter.

The bifilar vibration damper of the present invention as shown in FIGS. 4 and 5 again includes a mass in the form of a U-shaped weight 11 connected by two pins 26 at an end of a supporting arm 13 arranged to extend radially from and for rotation about an axis of rotation 24. The pins 26 are located in apertures 27 provided through parallel side portions 28 of the weight 11 and in apertures 29 through the supporting arm 13. In the embodiment shown the apertures 27 and 29 are of generally semi-circular shape having a radiussed section and a straight section joined by radii of smaller dimension than that of the radiussed section. The radiussed section of the apertures 29 in the support arm 13 are concentric about parallel axes which are parallel to and equidistant from the axis of rotation 24, the apertures 29 being located with their radiussed section furthest from the axis of rotation 24. The radiussed section of the apertures 27 in the side portions 28 of the weight 11 are arranged concentric about parallel axes which are parallel with the axis of rotation 24, the apertures 27 being of similar dimension as the apertures 29 in the support arm 13, the apertures 27 through each side portion 28 being aligned with the apertures 27 in the other side portion and located with their radiussed section closest to the axis of rotation 24.

The pins 26 are of circular cross-section having a radius less than that of the radiussed section of the apertures 27 and 29 so that pendulous movements of the weight 11 are permitted by rolling movements of the pins 26 around the radiussed sections of the apertures 27 and 29.

The side portions 28 of the weight 11 are spaced so as to define a spacing distance from the surfaces of the support arm 13 when the U-shaped weight 11 is centred laterally with respect to the arm 13, and a spacer member 20 is located in each spacing distance to support the pins 26 in their operative position.

Figure 4:
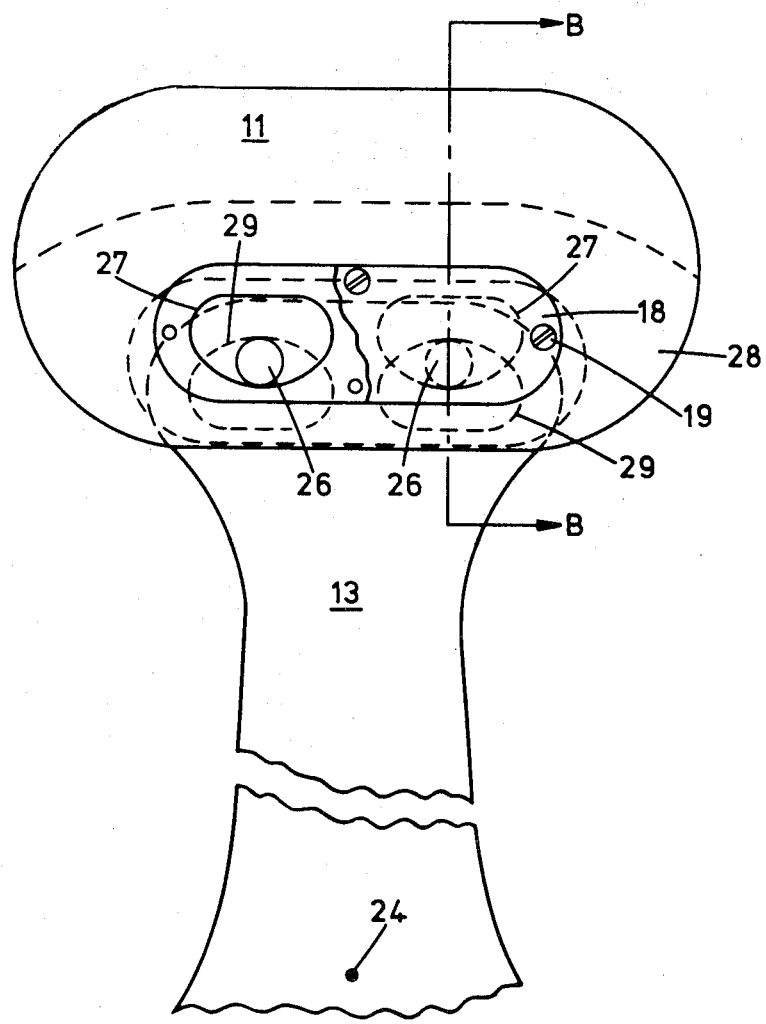
FIG. 4 is a plan view of an improved bifilar damper according to the invention.

The pins 26 have spherical ends and are retained in an operative position in the apertures 27 and 29 by an end plate 18 secured by screws 19 in a recess in each of the outer surfaces of the parallel side portions 28 of the weight 11 so that the outer surfaces of the plates 18 are flush with the surface of the weight 11, the plate 18 being large enough to cover both apertures 27. In FIG. 4, part of one of the plates 18 has been omitted to clearly show the semi-circular shape of the apertures 27 and 29.

Figure 6:
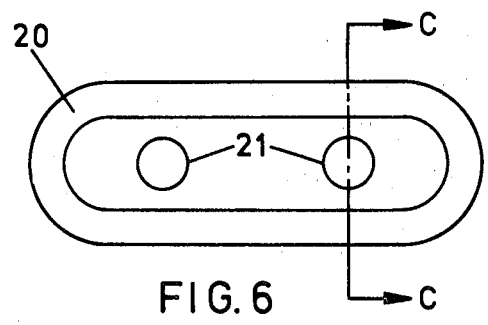
FIG. 6 is a plan view of a detail part of the improved bifilar.
Figure 7:
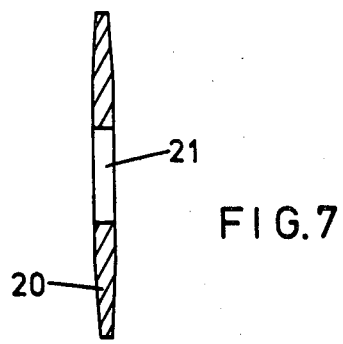
FIG. 7 is a sectioned view on lines C—C of FIG. 6.

FIGS. 6 and 7 show details of one of the spacer members 20. As shown, each member 20 is of elongated planform having radiussed ends and being provided with two holes 21 at similar centre dimensions to the pairs of apertures 27 and 29 in both the weight 11 and the support 13. The diameter of the holes 21 is such as to permit rotation of the pins 26 within the holes 21 and, as will be clear from FIG. 7, in the embodiment shown the member 20 is tapered around its edge from a maximum thickness within an area encompassing both holes 21 to a minimum thickness around its perimeter so as to be wedge shaped tapering in thickness in a direction away from the area of maximum thickness. This tapered configuration has certain operational advantages, but it is to be understood that the use of a spacer member of uniform thickness is not excluded. Preferably also, the members 20 are of different material than the weight 11 and the support 13.

In operation, a bifilar damper is tuned to cancel vibrations of a particular frequency by suitable selection of the mass of the weight 11 and of the radii of the pins 26 and the radiussed section of the apertures 27 and 29.

In the case of existing bifilar dampers as shown in FIGS. 2 and 3, rotation of the pins 12 during pendulous movements of the weight 11 also causes rotation of the relatively large washers 15, thereby creating a high inertia in the washers 15, resulting in a reduction in frequency leading to a detuning of the damper. Such detuning will have an adverse effect on the operational capabilities, and could well be of sufficient magnitude to render existing constructions ineffective. A further disadvantage of existing bifilars is that the pins and rolling surfaces are unprotected and, therefore, prone to the ingress of dirt and moisture, resulting in inefficient operation and high maintenance.

Figure 5:
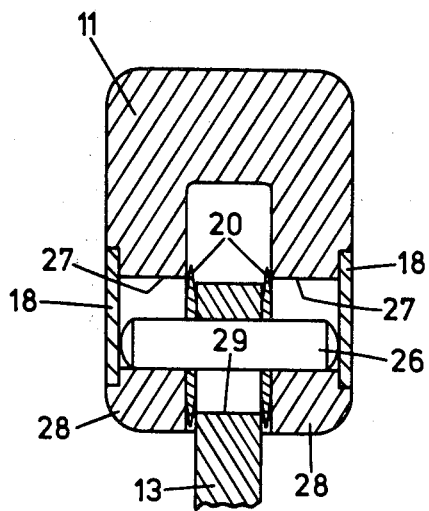
FIG. 5 is a sectioned view on lines B—B of FIG. 4.

These problems are overcome by the improved bifilar vibration damper of the present invention as shown in FIGS. 4 and 5. The pendulous movements of the weight 11 causes rotation of the pins 26 within the holes 21 in the spacer members 20. As both pins 26 are located through each of the members 20, there is no tendency for the members 20 to rotate as do the washers in known dampers, which means that there are no inertia problems to adversely affect the tuning of the dampers, as hereinbefore explained in connection with existing devices. The members 20 are of a size suitable to cover both of the apertures 27 in the weight 11 and the apertures 29 in the support 13, with the weight 11 in any of its extreme positions relative the support 13. The generally semi-circular shape of the apertures 27 and 29 in the present invention enables the spacer members 20 to perform this function without being increased to extreme dimensions because the apertures have a radiussed section long enough only to permit the necessary pendulous movements, the remaining section of each aperture 27 and 29 being straight and joined to the radiussed section by radii of a smaller dimension than that of the radiussed section, thereby effectively reducing the area of the apertures 27 and 29 with respect to the circular shapes employed in existing devices. The apertures 27 and 29 are effectively closed at their other ends in the U-shaped weight 11 by the end plates 18 used to retain the pins 26, thereby providing an assembly in which the ingress of dirt and moisture into the crucial areas is prevented. This arrangement is also effective for retaining a lubricating agent within the assembly.

The wedge shape of the members 20 (FIG. 7) ensures that line contact only occurs between the members 20 and the edges of the apertures 27 and 29, thereby reducing friction to a minimum during movements of the weight 11 relative the support 13. The spherical ends of the pins 26 reduces friction between the rotating pins 26 and the end plates 18.

The present invention provides, therefore, an improved bifilar vibration damper which is simpler in construction, more efficient, requires less maintenance, and is of an aerodynamically cleaner shape than existing devices.

In one application, at least three of our improved bifilar dampers are arranged symmetrically about the rotational axis of a helicopter main rotor system, each damper being supported at the end of an arm extending radially from a hub secured on the upper surface of a rotor head. The dampers rotate in a plane perpendicular to the axis of rotation, or parallel to the plane of rotation of the rotor, and are tuned to cancel in-plane vibration forces acting on the rotor head. In other installations, the dampers could be rotated through 90° and tuned to absorb moment and/or shear forces effective on the particular helicopter rotor system in which they are installed.

Although one embodiment of the invention has been described and illustrated, it is to be understood that modifications can be made without departing from the scope of the appended claims. For instance, the parts of the assembly could be reversed so that the support comprises a U-shaped member and the mass comprises a weight located and retained between parallel arms of the support. Although it will be apparent that certain advantages derive from the generally semi-circular shape of the apertures 27 and 29, the invention is not to be considered limited thereto. Other suitable shapes, for instance circular, oval or arcuate slot apertures, could be used as long as a radiussed section is located and positioned as hereinbefore defined along which the pins 26 roll during operation.

We claim as our invention:

1. A bifilar vibration damper comprising, in combination, a support arm arranged to extend radially from and to be rotated in a plane about an axis of rotation and having two generally semi-circular shaped apertures extending therethrough, said aperture including a radiussed section and a straight section, the radiussed section of each aperture being concentric about parallel axes which are parallel to and equidistant from the axis of rotation, the apertures being located with their radiussed surface furthest from the axis of rotation, a pendulous member of U-shaped cross-section having substantially parallel side portions arranged to be positioned on opposite sides of the support member and spaced so as to define a spacing distance from said support member, each side portion having two generally semi-circular shaped apertures extending therethrough, said apertures including a radiussed section and a straight section, the radiussed section of each aperture being concentric about parallel axes which are parallel to the axis of rotation and being of substantially similar dimension as the support member apertures, the apertures in each side portion being aligned respectively with the apertures of the other side portion and located with their radiussed sections closest to the axis of rotation, said pendulous member being capable of pendulous movement relative to the support arm, a pin member extending through each of the apertures of the support member and the aligned apertures of the side portions to connect the pendulous member to the support member, the pin member being of substantially circular cross-section, a spacer member positioned in each spacing distance, each spacer member having two holes through which the pin members are rotatably positioned so as to support the pin members in operative position, an end plate secured on an outer surface of each side portion over the apertures to retain the pin members in an operative position.

2. A bifilar vibration damper as claimed in claim 1, wherein each spacer member is arranged so that its periphery overlaps the dimensions of the apertures through the support and the side portions of the U-shaped part when the U-shaped part is in any operative position relative the other part.

3. A bifilar vibration damper as claimed in claim 1, wherein each spacer member is of maximum thickness within an area encompassing both holes through which the pins are located and of minimum thickness around its periphery so as to be wedge shaped tapering in thickness in a direction away from the area of maximum thickness encompassing both apertures.

4. A bifilar vibration damper as claimed in claim 1, wherein the ends of each pin are spherical.

5. A bifilar vibration damper as claimed in claim 1, wherein the end plates are located in recesses in the outer surfaces of the side portions of the U-shaped parts so that the outer surfaces of the end plates are generally flush with the outer surfaces of the side portions.

6. A bifilar vibration damper as claimed in claim 1, further including a helicopter main rotor system having a hub wherein said axis of rotation is the axis of rotation of said helicopter rotor system, and said support arm extending radially from the rotor hub for rotation with the rotor system in a plane perpendicular to the axis of rotation.

7. A bifilar vibration damper as claimed in claim 6 wherein the damper is tuned to absorb vibrations in the plane of the helicopter rotor.

8. A helicopter having a main rotor system including a plurality of rotor blades arranged for rotation about an axis of rotation, and at least three bifilar vibration dampers each including, a support member arranged to extend radially from and to be rotated in a plane about the axis of rotation and having two semi-circular apertures extending therethrough, each having a radiussed section concentric about parallel axes which are parallel to and equidistant from the axis of rotation, the apertures being located with their radiussed surfaces furthest from the axis of rotation, a pendulous member of U-shaped cross-section having substantially parallel side portions arranged to be positioned on opposite sides of the support member and spaced so as to define a spacing distance from said support member, each side portion having two semi-circular apertures extending therethrough, each having a radiussed section concentric about parallel axes which are parallel to the axis of rotation and being of substantially similar dimension as the support member apertures, the apertures in each side portion being aligned respectively with the apertures of the other side portion and located with their radiussed surfaces closest to the axis of rotation, a pin member extending through each of the apertures of the support member and the aligned apertures of the side portions to connect the pendulous member to the support member, the pin member being of substantially circular cross-section and having a radius less than the radius of the radiussed section of the apertures, a spacer member positioned between the support member and each of the side portions and having two holes to permit rolling of the pin members and an external shape arranged so that a periphery of the spacer member overlaps the apertures in the support member and the side portions with the pendulous member in any of its extreme operational positions relative the support, and an end plate secured on an outer surface of the side portions over the apertures to retain the pin members in an operative position.

* * * * *